(12) United States Patent
Guan

(10) Patent No.: US 12,276,568 B2
(45) Date of Patent: Apr. 15, 2025

(54) SENSING DEVICE AND BEARING COMPONENT

(71) Applicant: Schaeffler Technologies AG & Co. KG, Herzogenaurach (DE)

(72) Inventor: Ran Guan, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 363 days.

(21) Appl. No.: 17/792,428

(22) PCT Filed: Jan. 13, 2020

(86) PCT No.: PCT/CN2020/071715
§ 371 (c)(1),
(2) Date: Jul. 13, 2022

(87) PCT Pub. No.: WO2021/142569
PCT Pub. Date: Jul. 22, 2021

(65) Prior Publication Data
US 2023/0063769 A1 Mar. 2, 2023

(51) Int. Cl.
*G01M 13/04* (2019.01)
*G01L 1/22* (2006.01)
*G06K 19/07* (2006.01)

(52) U.S. Cl.
CPC ........... *G01M 13/04* (2013.01); *G01L 1/2281* (2013.01); *G06K 19/0723* (2013.01)

(58) Field of Classification Search
CPC . G01M 13/04; G01L 1/2281; G06K 19/0723; F16C 19/522; F16C 19/525; F16C 19/364; F16C 2233/00
See application file for complete search history.

(56) References Cited

U.S. PATENT DOCUMENTS

| | | | | |
|---|---|---|---|---|
| 6,971,799 | B2* | 12/2005 | Sato | G08C 19/38 384/448 |
| 7,762,128 | B2* | 7/2010 | Ozaki | B60B 27/00 73/115.07 |
| 7,856,893 | B2* | 12/2010 | Ozaki | F16C 19/522 73/862.321 |

(Continued)

FOREIGN PATENT DOCUMENTS

| | | |
|---|---|---|
| CN | 101292090 | 10/2008 |
| CN | 101819091 | 9/2010 |

(Continued)

*Primary Examiner* — Freddie Kirkland, III
(74) *Attorney, Agent, or Firm* — Volpe Koenig

(57) ABSTRACT

A sensing device for a bearing and a bearing component. The sensing device includes a sensing body for mounting into the bearing by a press fit. The sensing body is provided with: a sensing measurement module having a pressure sensor for measuring the load of the bearing and a temperature sensor for measuring the temperature of the sensing device, and the measured load is corrected using the measured temperature; a wireless communication module used for wirelessly transmitting bearing information from the sensing measurement module; and a wireless power supply module used for supplying power for the sensing measurement module and the wireless communication module. The bearing component includes a bearing and the sensing device.

16 Claims, 1 Drawing Sheet

(56) References Cited

U.S. PATENT DOCUMENTS

| | | | | |
|---|---|---|---|---|
| 8,578,791 | B2* | 11/2013 | Ikki | B60B 27/0005 |
| | | | | 73/862.045 |
| 8,864,382 | B2* | 10/2014 | Ono | B60B 7/061 |
| | | | | 384/544 |
| 9,008,899 | B2* | 4/2015 | Nishikawa | G01L 25/00 |
| | | | | 73/1.15 |
| 10,378,515 | B2* | 8/2019 | Kibsgaard | F03D 7/0224 |
| 11,571,928 | B2* | 2/2023 | Baliva | F16C 19/522 |
| 11,894,699 | B2* | 2/2024 | Michiwaki | H04B 5/48 |
| 2007/0068273 | A1 | 3/2007 | Cunningham | |
| 2009/0097791 | A1* | 4/2009 | Ozaki | B60B 27/00 |
| | | | | 384/448 |
| 2009/0175568 | A1* | 7/2009 | Ozaki | G01L 5/0019 |
| | | | | 384/448 |
| 2012/0020603 | A1 | 1/2012 | Stubenrauch et al. | |
| 2013/0066517 | A1* | 3/2013 | Nishikawa | F16C 19/186 |
| | | | | 29/898 |
| 2016/0123304 | A1* | 5/2016 | Kibsgaard | G05B 15/02 |
| | | | | 700/287 |
| 2020/0166076 | A1* | 5/2020 | Neugebauer | G01L 5/0019 |
| 2022/0404222 | A1* | 12/2022 | Murata | G01L 1/225 |

FOREIGN PATENT DOCUMENTS

| | | |
|---|---|---|
| CN | 201673594 | 12/2010 |
| CN | 102265046 | 11/2011 |
| CN | 205981278 | 2/2017 |
| CN | 104595352 | 5/2017 |
| CN | 106683387 | 5/2017 |
| CN | 107448362 | 12/2017 |
| CN | 207779581 | 8/2018 |
| DE | 102011006907 B4 | 10/2012 |
| DE | 102017111745 A1 | 12/2018 |

* cited by examiner

SENSING DEVICE AND BEARING COMPONENT

CROSS-REFERENCE TO RELATED APPLICATIONS

This application is the U.S. National Phase of PCT Appln. No. PCT/CN2020/071715, filed Jan. 13, 2020, the entire disclosure of which is incorporated by reference herein.

TECHNICAL FIELD

The present disclosure relates to a sensing device for a bearing, in particular to a wireless sensing device. The present disclosure further relates to a bearing component comprising a sensing device.

BACKGROUND

Bearing load is a very important parameter for controlling, optimizing and monitoring the operation of a device. Therefore, there is always a need for a measurement solution for bearing load, especially the load of large-sized bearings in the field of wind energy. There are currently a variety of load measurement solutions for bearings.

For example, Chinese patent document CN 102265046 A teaches a bearing unit, which measures a load by connecting strain gauges to a load area of the housing, especially the bearing seat.

For another example, Chinese patent document CN 107448362 B teaches a state detection solution for a slewing bearing, which discloses a process of detecting a displacement change caused by a load by using an eddy current sensor.

For another example, Chinese Patent Document CN 104595352 B teaches a load detection device for a rolling bearing, and the load detection device is configured as a pin-type device.

However, the above-mentioned bearing load measurement solutions have certain defects.

For the measurement solution of using a strain gauge, in many applications, the direction of the bearing load is constantly changing during operation, and thus multiple strain gauges are required, which makes the design solution complicated and costly.

In addition, for the measurement solution of using an eddy current sensor, since the eddy current sensor is seriously affected by temperature, the displacement (radial or axial) between an inner ring and an outer ring as measured by the eddy current sensor varies not only with load but also with temperature. In addition, bearings with eddy current sensors usually require additional axial space for installation and are therefore not interchangeable with standard designs.

Besides, power supply and signal transmission may impose restrictions on pin-type load sensors. When a real-time measurement is required, it is necessary to arrange a plurality of the pin-type load sensors in the circumferential direction of the fixed bearing ring. In addition, the requirement for a special layout of the electrical conductors makes the design work even more complicated.

SUMMARY

Therefore, the technical problem to be solved by the present disclosure is to provide a sensing device for a bearing that can overcome the above-mentioned defects.

The above-mentioned technical problem is solved by a sensing device for a bearing. The sensing device comprises a sensing body for mounting into a bearing by a press fit, wherein the sensing body is provided with: a sensing measurement module, a wireless communication module and a wireless power supply module.

The sensing body is mounted into a bearing member of the bearing by a press fit. The bearing member may here be a rolling element of a rolling bearing or a fixed or rotating bearing ring, such as an outer ring or an inner ring, wherein the rolling element is a non-spherical rolling element. Due to the press fit, the loads borne by the bearing member in various directions can be conducted to the sensing body for load measurement by the sensing measurement module on the sensing body. In addition to conducting load, the sensing body also has a bearing function, which allows the elements of the above-mentioned three modules to be firmly mounted into the bearing member.

The sensing measurement module comprises a pressure sensor for measuring the load of the bearing and a temperature sensor for measuring the temperature of the sensing device, wherein the measured load is corrected by the measured temperature.

Here, the sensing measurement module further comprises a measurement signal processing unit for the pressure sensor and/or the temperature sensor. The measurement signal processing unit may comprise, for example, a measurement circuit matching the sensor, an amplification circuit, an analog-to-digital conversion circuit, and the like. Optionally, the measurement signal processing unit may further comprise a compensation operation unit, which corrects the load measured by the pressure sensor using the temperature measured by the temperature sensor. The pressure sensor may here be a piezoelectric pressure sensor, a piezoresistive pressure sensor, a capacitive pressure sensor or an electromagnetic pressure sensor. The temperature sensor may here be a separately arranged sensor, preferably a temperature sensor integrated in a chip.

The wireless communication module is used for wirelessly transmitting bearing information from the sensing measurement module.

Here, the wireless communication module comprises a signal processing unit and a signal transmitting and/or receiving part arranged at the bearing, such that wireless communication with the receiving and/or transmitting part arranged outside the bearing may be performed. The wireless communication module can wirelessly transmit the load information obtained after temperature correction from the bearing to the signal receiving part arranged outside the bearing, so as to be read or utilized by relevant technicians and/or equipment. The wireless communication module can also wirelessly transmit the bearing load information and the temperature information matched therewith from the bearing to the signal receiving part arranged outside the bearing, respectively, and, after temperature correction is performed by the compensation operation unit outside the bearing, provide the bearing load information obtained after temperature correction for the relevant technical technicians and/or equipment.

The wireless power supply module is used for supplying power for the sensing measurement module and the wireless communication module.

Here, the wireless power supply module comprises a power receiving antenna arranged at the bearing, which can obtain energy from electromagnetic waves supplied by power supply counterpart equipment arranged outside the bearing. The power supply counterpart equipment here comprises, for example, a power supply antenna which may be electromagnetically coupled to the power receiving antenna, a power supply circuit that supplies the power supply antenna and a corresponding control unit. The wireless power supply module may also comprise a power management circuit.

In a particularly preferred embodiment, the sensing body has a pin-shaped base and a printed circuit board, wherein the base may be mounted into the bearing by a press fit, and wherein the printed circuit board is used to partially mount elements, in particular electronic elements, in the sensing measurement module, the wireless communication module and the wireless power supply module into the base. That is, the sensing body is integrally configured as a pin-type structure, i.e., a sensing pin. The sensing body may be mounted in a mounting hole of the bearing member through the base, where the base may be at least partially press-fitted into the mounting hole. Preferably, the base is press-fitted into the mounting hole at one axial end. The cross-sections of the base and the mounting hole can be correspondingly designed into various shapes, preferably a regular polygon, particularly preferably a circle. Preferably, the mounting hole is a blind hole. Here, the mounting hole in the bearing ring preferably extends parallel to a central axis of the bearing or the bearing ring, thereby facilitating efficient measurement of the bearing load. The mounting hole in the rolling element preferably extends along a central axis of the rolling element. Preferably, a plane for arranging the printed circuit board is configured on the peripheral surface of the base. Here, the plane is preferably perpendicular to the axial end face of the base. The arrangement of the plane avoids interference of the printed circuit board with the press-fit region of the base as much as possible.

In a preferred embodiment, the wireless communication module comprises an RFID chip arranged on the printed circuit board and an antenna arranged on the base, wherein the RFID chip and the antenna are used for conducting wireless communication with communication counterpart equipment arranged outside the bearing. Here, Radio Frequency Identification technology (RFID technology) is used to achieve wireless communication. Specifically, the RFID chip and the antenna together constitute an RFID tag, and the communication counterpart equipment comprises, for example, an RFID reader/writer, which can perform wireless data communication with the RFID tag. That is to say, the bearing information provided by the sensing measurement module is modulated to a carrier RF electromagnetic wave and transmitted by the antenna, so that the load condition of the bearing can be monitored wirelessly in real time. Here, the antenna is preferably a miniature antenna, such as a metal dipole antenna, a PCB printed antenna or a ceramic antenna. Preferably, the antenna is a ceramic antenna, which can obtain a large antenna gain with a small size.

In a preferred embodiment, the pressure sensor comprises at least two strain gauges, wherein the at least two strain gauges are arranged in a region of the base for achieving a press fit, wherein one of the at least two strain gauges may be arranged at an axial end face of the base, and the other of the at least two strain gauges may be arranged on a peripheral surface of the base in a manner of at least partially extending in an axial direction. Preferably, the strain gauges are arranged in the axial end face in this way, such that the measurement direction thereof extends in a radial direction of the base or passes through a central axis of the base. Preferably, in the region of the axial end of the base where a press fit is achieved, a plane is partially constructed on the peripheral surface of the base, so as to form an accommodation space for the strain gauges. Here, the plane is preferably perpendicular to the axial end face of the base. Preferably, the strain gauges are arranged in the accommodation plane in such a way that the measurement direction thereof extends along an axial direction of the base or is parallel to a central axis of the base. Each strain gauge is here connected to a corresponding measurement circuit by electrical conductors. Two strain gauges may be used here as a measurement strain gauge and a reference strain gauge, respectively. Preferably, the measurement directions of the measurement strain gauge and the reference strain gauge are perpendicular to each other. Preferably, the strain gauge arranged at the axial end face of the base is used as a measurement strain gauge, and the strain gauge arranged in the accommodation space of the peripheral surface of the base is used as the reference strain gauge. Here, particularly preferably, the plane forming the accommodation space and the printed circuit board have the same axial position and/or are parallel to each other. Here, the strain gauge may be a metal resistance strain gauge or a semiconductor strain gauge. In order to reduce the power consumption as much as possible, the measurement strain gauge is preferably a semiconductor strain gauge, which has the advantages of large resistance strain and high strain sensitivity. The strain gauge may be mounted on the base in a variety of ways. For example, the strain gauge may be attached to the base by an adhesive. Alternatively, the strain gauge may also be fixed to the base by spot welding or another welding scheme. Alternatively, the strain gauge may also be fixed to the base by a MEMS manufacturing process.

Here, preferably, a measurement circuit and a measurement signal processing circuit for the strain gauge are arranged on the printed circuit board. The measurement circuit is here preferably a Wheatstone bridge, in particular a half bridge circuit for two strain gauges. The measurement signal processing circuit comprises an amplification circuit, an analog-to-digital conversion circuit, etc.

Here, particularly preferably, the RFID chip provides the analog-to-digital conversion circuit in the measurement signal processing circuit. Therefore, the integration degree of the sensing device is improved, which is beneficial to reducing the size of the sensing device, in particular the sensing body.

Here, particularly preferably, the RFID chip provides a temperature sensor. Thus, there is no need to additionally provide a temperature sensor, and only the temperature sensor integrated in the RFID chip is used, which improves the integration degree of the sensing device, and is beneficial to reducing the size of the sensing device, in particular the sensing body.

Here, preferably, the antenna is arranged on an axial end face of the base, wherein the axial end face on which the antenna is arranged is opposite to an axial end face on which the strain gauge is arranged. Thus, when the base is mounted to the bearing member, the antenna can be located on the axial end side of the bearing to better achieve the function thereof.

Here, particularly preferably, an antenna cover is provided on an outer side of the antenna. In this case, the antenna cover is made of plastic, such as ABS, PPS, or PTFE. The antenna is thereby advantageously protected when low power radio frequency signals can pass through the antenna cover.

Here, it is particularly advantageous to provide a sealing elastomer, in particular a sealing rubber, between the antenna and the antenna cover, so that the antenna can be better protected.

In a preferred embodiment, the antenna described above can be used as a power receiving antenna for the wireless power supply module, so as to wirelessly obtain the energy supplied by power supply counterpart equipment arranged outside the bearing. When the power supply antenna of the power supply counterpart equipment emits electromagnetic waves, the electromagnetic waves radiate to the power receiving antenna through the antenna cover and a sealing elastic part that may exist, and then the power receiving antenna obtains energy from the electromagnetic waves, wherein the obtained energy can be stored in a capacitor.

Here, particularly preferably, the RFID chip provides a power management circuit of the wireless power supply module. Therefore, the energy stored in the capacitor can be processed by a power management circuit in the RFID sensing chip to provide a stable power supply. Such design improves the integration degree of the sensing device and is beneficial to reducing the size of the sensing device, in particular the sensing body.

In an advantageous embodiment, a channel for accommodating electrical conductors is arranged inside the base. The channels may be configured to be in the form of a through hole, a blind hole or a groove, etc. Electrical conductors are here, for example, conductors for electrically connecting strain gauges with the printed circuit board. Electrical conductors are here, for example, conductors for electrically connecting the antenna with the printed circuit board. The arrangement of the channel especially avoids the influence of wiring on a press-fit region. The material of the electrical conductors is selected such that the temperature coefficient of resistance varies less within a normal working temperature range, so as to eliminate the influence of temperature on the measurement result of the sensing device as much as possible.

In an advantageous embodiment, the base is provided with an additional connecting structure for connecting with the bearing member. Preferably, an external thread may be configured on an axial end of the base, and an internal thread may be configured in the mounting hole, especially in the step part of the mounting hole, wherein the axial end is located at the opening of the mounting hole when the sensing device is mounted in the mounting hole, so that the base and the mounting hole may be connected with the aid of a thread.

Here, it is particularly advantageous that the base is of the same material as the bearing member on which the sensing device is mounted. The influence of temperature-induced dimensional changes of the material can thus be minimized.

In an advantageous embodiment, the sensing device is at least partially encapsulated, thereby advantageously reducing or preventing impacts or the effects of liquids on the sensing device, in particular electronic components in the sensing device. Here, the encapsulation process may advantageously avoid the auxiliary connection structure of the base. Advantageously, the encapsulation may be performed by using plastic, rubber or an adhesive, or the like.

The above-mentioned technical problem may also be solved by a bearing component comprising a bearing, in particular a rolling bearing, and the sensing device as described above.

Here, preferably, the sensing body of the sensing device may be mounted in a mounting hole of an outer ring or an inner ring of the bearing, wherein the mounting hole extends along an axial direction of the bearing, that is, extends parallel to a central axis of the bearing. Alternatively and preferably, the sensing body of the sensing device is mounted in a mounting hole of the rolling element of the bearing, wherein the mounting hole extends along the central axis of the rolling element.

Here, the mounting hole is preferably a blind hole. Preferably, the sensing body is mounted in the mounting hole in such a way that the antenna of the sensing device for the wireless power supply module is located at the opening of the mounting hole. Preferably, the sensing body is mounted to the mounting hole in such a way that the sensing device does not protrude out of the mounting hole, which thus avoids collision between the sensing device and other members. Preferably, when the sensing body is mounted to a bearing ring, such as an outer ring or an inner ring, it is preferably mounted to the mounting hole of the bearing ring such that the measurement direction of the strain gauges arranged on the axial end face of the base in the sensing measurement module is aligned along the radial direction of the bearing.

The above-mentioned technical problem may also be solved by a sensing system for a bearing, the sensing system comprising a sensing device having the above-mentioned features and sensing device counterpart equipment arranged outside the bearing. Here, the sensing device counterpart equipment comprises communication counterpart equipment and power supply counterpart equipment, wherein the communication counterpart equipment can perform wireless communication with the wireless communication module of the sensing device arranged on the bearing, and the power supply counterpart equipment can cooperate with the wireless power supply module of the sensing device of the bearing to supply power in a wireless or non-contact manner for the sensing measurement module and the wireless communication module of the sensing device. Here, a plurality of sensing devices may be matched with common sensing device counterpart equipment, wherein each sensing device may have its own identifier. In this case, the plurality of sensing devices may be arranged on the same bearing or on different bearings.

The above-mentioned technical problem may also be solved by a bearing assembly comprising a bearing and the sensing system as described above.

In summary, a variety of advantages can be achieved through the solution of the present disclosure. As the temperature at the sensing device is additionally measured, the load value measured by the pressure sensor can be corrected using the measured temperature, in particular, the measurement error caused by the influence of the temperature on the electrical conductors and the pressure sensor, such as the strain gauges, can be reduced, and thus the accuracy of the load measurement can be improved.

In addition, as the sensing device is configured with the wireless communication module and the wireless power supply module, the sensing device can provide the bearing load information in real time when arranged to a rotating member of the bearing, such as a rolling element and a rotatable bearing ring. Also, as the sensing device can be arranged on the rotating member of the bearing, the sensing device can perform load measurements at various positions in the circumferential direction of the bearing during rotation with the rotating member. Therefore, the measurement requirements can be satisfied by providing only one such sensing device in each bearing. Compared with the existing solution that requires multiple sensing devices for mounting to a fixed bearing ring, and the solution that cannot achieve coexistence between real-time measurement and mounting to a rotating member, the sensing device well achieves real-time measurement; and besides, it requires fewer mounting holes and eliminates the arrangement of communication lines and power supply lines, which brings a simpler design structure, lower cost, and higher reliability. In addition, as the sensing device works independently of a battery, maintenance work such as battery replacement is eliminated.

In addition, as the RFID chip can provide an analog-to-digital conversion circuit and a temperature sensor for the sensing measurement module and the power management circuit for the wireless power supply module while achieving the function of wireless communication with the communication counterpart equipment, it is possible to achieve a high integration degree of the sensing device, as well as a reduction in both the size of the sensing device and the cost. Thanks to the highly integrated RFID chip and the strain gauges with high resistance and high sensitivity, the power consumption of the sensing device can be reduced to several hundred microwatts or below. In an open environment, the effective distance of such a sensing device integrating an RFID chip and a strain gauge may be 5 meters or more, which makes the sensing device suitable for most applications.

BRIEF DESCRIPTION OF THE DRAWINGS

Preferred embodiments of the present disclosure will be schematically illustrated below with reference to drawings. Drawings are as follows.

DETAILED DESCRIPTION

Figure 1:
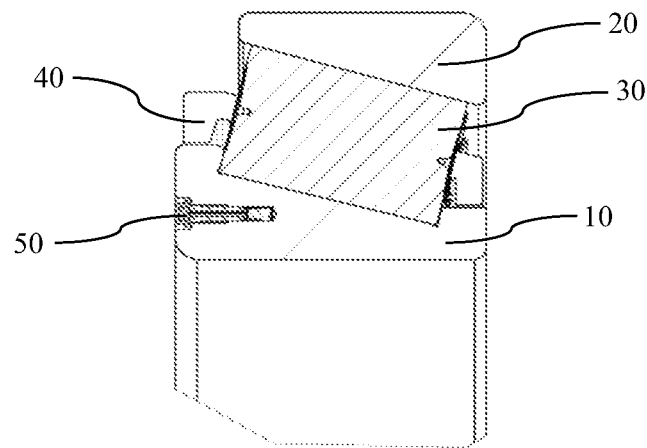
FIG. 1 is a partial cross-sectional view of a bearing component according to a preferred embodiment.

FIG. 1 shows a partial cross-sectional view of a bearing component according to a preferred embodiment. The bearing component comprises a bearing designed as a tapered roller bearing and a sensing device 50. As shown in FIG. 1, the bearing comprises an outer ring 20, an inner ring 10, and a retainer 40 and a tapered roller type rolling element 30 arranged between the outer ring 20 and the inner ring 10.

As shown in FIG. 1, the inner ring 10 of the bearing is configured with a mounting hole for accommodating a sensing device. The mounting hole is configured as a blind hole and extends parallel to a central axis of the bearing. In this embodiment, the sensing device 50 is implemented as a sensing pin for wireless communication and wireless power supply.

Figure 2:
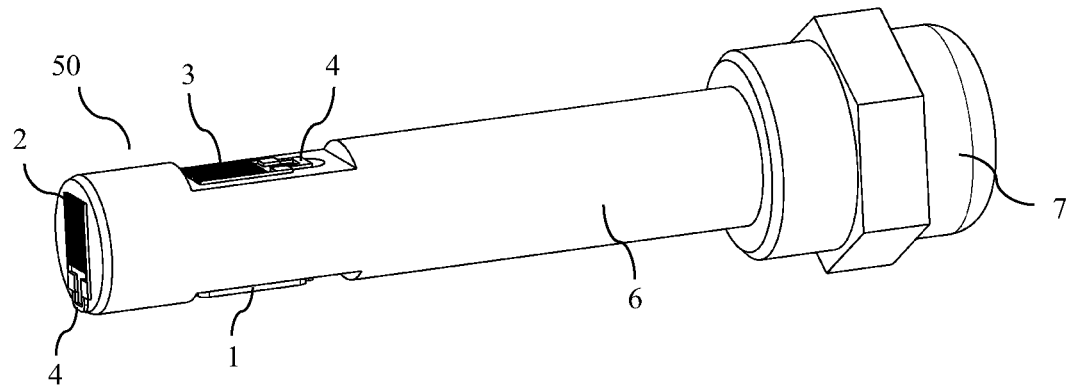
FIG. 2 is a perspective view of the sensing device in the bearing component according to FIG. 1.
Figure 3:
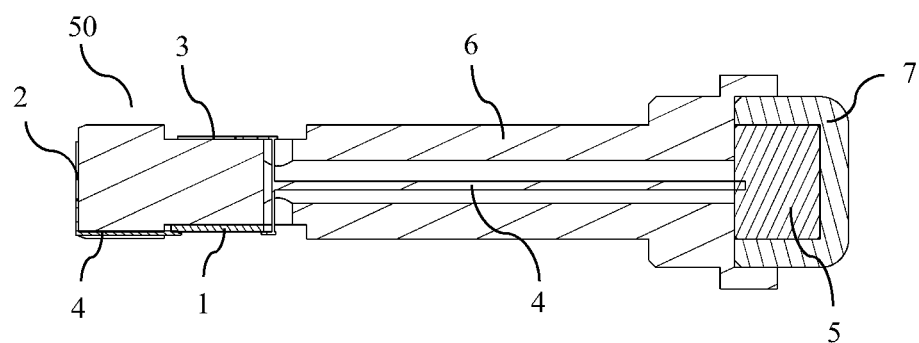
FIG. 3 is a cross-sectional view of the sensing device according to FIG. 2, obtained by sectioning along an axial direction thereof.

FIG. 2 and FIG. 3 respectively show a perspective view of the sensing device 50 in the bearing component according to FIG. 1 and a cross-sectional view obtained by sectioning the sensing device 50 along the axial direction thereof. As shown in FIG. 2 and FIG. 3, the sensing device 50 comprises a sensing body for mounting into the inner ring 10 of the bearing. The sensing body is configured with a sensing measurement module, a wireless communication module and a wireless power supply module.

The sensing body comprises a pin-shaped base 6 and a printed circuit board 1. The pin-shaped base 6 has a substantially circular cross-section. The pin-shaped base 6 is made of the same material as the inner ring 10, thereby minimizing the effect of temperature-induced size changes of the material. The peripheral surface of the base 6 is partially configured with a plane on which the printed circuit board 1 is arranged.

Referring to FIGS. 1, 2 and 3, the sensing body is fixed in the mounting hole of the inner ring 10 with a pin-shaped base 6 by a press fit. Furthermore, when the base 6 is mounted, the axial end of the base at the opening of the mounting hole is also provided with a step part, and the peripheral surface of which is provided with an external thread not shown in detail, wherein the external thread can match an internal thread configured in the stepped mounting hole to achieve an auxiliary threaded connection.

The sensing measurement module comprises a pressure sensor for measuring the axial and radial loads of the bearing and a temperature sensor for measuring the temperature of the sensing device. The pressure sensor comprises two strain gauges, namely a measurement strain gauge 2 and a reference strain gauge 3 which are arranged in a press-fit region. The measurement strain gauge 2 and the reference strain gauge 3 are here preferably semiconductor strain gauges with a large resistance strain and a high strain sensitivity. The measurement strain gauge 2 is attached to an axial end face, facing the hole bottom of the mounting hole, of the base 6. Here, the longitudinal direction of the measurement strain gauge 2 is aligned with the radial direction of the base 6. In the region where the press-fit of the base 6 is achieved, a plane is partially configured on the peripheral surface of the base 6, wherein the plane is perpendicular to the axial end face of the base 6, to which the reference strain gauge 3 is attached. Here, the plane in which the reference strain gauges 3 are arranged and the plane in which the printed circuit board 1 is arranged are parallel to each other at the base 6. Here, the longitudinal direction of the reference strain gauge 3 is parallel to a central axis of the base 6. The measurement strain gauge 2 and the reference strain gauge 3 are respectively connected to the measurement printed circuit board 1 by electrical conductors 4. Here, a channel for accommodating and guiding the electrical conductors 4 is configured in the base 6. The printed circuit board 1 is provided with a measurement circuit for strain gauges, an amplification circuit, and an analog-to-digital conversion circuit, wherein the measurement circuit is a Wheatstone bridge here, and the analog-to-digital conversion circuit is provided by an RFID chip arranged on the printed circuit board 1. During the measurement process, the strain on the base 6 caused by the bearing load causes a resistance change of the measurement strain gauge 2, wherein the resistance change can be detected by the Wheatstone bridge measurement circuit and subsequently amplified by the amplification circuit and adjusted to fit the analog-to-digital conversion circuit in the RFID sensing chip. The RFID chip also provides a temperature sensor, from which the measured temperature can be used to correct the load measured by the pressure sensor. In this way, measurement errors caused by the influence of the temperature on the strain gauges and electrical conductors can be reduced. Here, the reference strain gauge 3, the electrical conductors 4, and the printed circuit board 1, together with the base 6, may be encapsulated by plastic.

The wireless communication module comprises the above-mentioned RFID chip arranged on the printed circuit board 1 and an antenna 5 arranged on an axial end face of the base 6, wherein the axial end face on which the antenna 5 is arranged is opposite to the axial end face on which the measurement strain gauge 2 is arranged. The antenna 5 is connected to the printed circuit board 1, in particular the RFID chip, by electrical conductors 4. The electrical conductors 4 are accommodated in a channel inside the base 6. Here, the RFID chip and the antenna 5 together constitute an RFID tag, and the communication counterpart equipment arranged outside the bearing comprises an RFID reader/writer, which can perform wireless data communication with the RFID tag. Here, the bearing information provided by the sensing measurement module is modulated to a carrier RF electromagnetic wave and transmitted by the antenna 5, so that the load condition of the bearing can be monitored wirelessly. The antenna 5 is here preferably a ceramic antenna, which can obtain a large antenna gain with a small size. An antenna cover 7 is provided on an outer side of the antenna 5. The antenna cover 7 is mounted on the base 6, for example, by a threaded connection. The antenna cover 7 is made of plastic, such as ABS, PPS, or PTFE, which can be penetrated by low power radio frequency signals. A sealing elastomer, in particular a sealing rubber, is provided between the antenna 5 and the antenna cover 7, so that the antenna 5 can be better protected.

The wireless power supply module comprises a power receiving antenna and a power management circuit. Here, the antenna 5 used for an RFID tag of the wireless communication module can be used as a power receiving antenna of the wireless power supply module. The RFID chip may provide a power management circuit. When the power supply antenna of the power supply counterpart equipment emits electromagnetic waves, the electromagnetic waves radiate to the antenna 5 through the antenna cover 7 and a sealing elastic part, wherein the antenna 5 acts as a power receiving antenna to obtain energy from the electromagnetic waves. The obtained energy may be stored in a capacitor and processed by the power management circuit to provide a stable power supply.

Thanks to the highly integrated RFID chip and the strain gauges with high resistance and high sensitivity, the power consumption of the sensing device can be reduced to several hundred microwatts or below. This is very important for the design of a passive wireless sensing device since it is closely related to the effective distance. In an open environment, the effective distance of the sensing device 50 according to this embodiment may be 5 meters or more, which makes the sensing device suitable for most applications. In addition, as the sensing device uses the wireless communication module and the wireless power supply module, the sensing device can provide the bearing load information in real time when arranged to a rotating member of the bearing. This also makes it possible for the sensing device to perform load measurements at various positions in the circumferential direction of the bearing during rotation with the rotating member. Therefore, the measurement requirements can be satisfied by providing only one such sensing device in each bearing.

Although possible embodiments have been described illustratively in the above description, it should be understood that there are still a large number of embodiment variations through combinations of all known technical features and embodiments as well as those are readily apparent to those skilled in the art. In addition, it should be further understood that the exemplary embodiments are just examples and shall not in any way limit the scope of protection, application and construction of the present disclosure. The foregoing description is more intended to provide those skilled in the art with a technical guide for converting at least one exemplary embodiment, in which various changes, especially changes in the functions and structures of the components, can be made as long as they do not depart from the scope of protection of the claims.

LIST OF REFERENCE NUMERALS

10 Inner ring
20 Outer ring
30 Rolling element
40 Retainer
50 Sensing pin of sensing device
1 Printed circuit board
2 Strain gauge
3 Strain gauge
4 Electrical conductor
5 Antenna
6 Base
7 Antenna cover

The invention claimed is:

1. A sensing device for a bearing, the sensing device comprising:
    a sensing body for mounting into the bearing by a press fit, the sensing body is provided with:
    a sensing measurement module comprising a pressure sensor configured for measuring a load of the bearing and a temperature sensor configured for measuring a temperature of the sensing device, wherein the sensing measurement module is configured to correct a measured load is using the measured temperature;
    a wireless communication module configured for wirelessly transmitting bearing information from the sensing measurement module; and
    a wireless power supply module configured for supplying power for the sensing measurement module and the wireless communication module;
    wherein the sensing body comprises a pin-shaped base and a printed circuit board, the base is mountable into the bearing by a press fit;
    wherein the wireless communication module comprises an RFID chip arranged on the printed circuit board and an antenna arranged on the base, and the RFID chip and the antenna are configured for conducting wireless communication with communication counterpart equipment arranged outside the bearing;
    wherein the pressure sensor comprises at least two strain gauges the at least two strain gauges are arranged in a region of the base for realizing the press fit, one of the at least two strain gauges is arranged on an axial end face of the base, and an other of the at least two strain gauges is arranged on a peripheral surface of the base at least partially extending in an axial direction;
    wherein a measurement circuit and a measurement signal processing circuit for the strain gauges are arranged on the printed circuit board;
    wherein the antenna is arranged on an axial end face of the base, the axial end face being opposite to an axial end face on which the strain gauge is arranged.

2. The sensing device according to claim 1, wherein the RFID chip includes an analog-to-digital conversion circuit in the measurement signal processing circuit.

3. The sensing device according to claim 1, wherein the temperature sensor is provided on the RFID chip.

4. The sensing device according to claim 1, wherein the antenna is arranged on an axial end face of the base, the axial end face being opposite to an axial end face on which the strain gauge is arranged.

5. The sensing device according to claim 4, further comprising an antenna cover on an outer side of the antenna.

6. The sensing device according to claim 5, further comprising a sealing elastomer between the antenna and the antenna cover.

7. The sensing device according to claim 1, wherein the antenna is configured as a power receiving antenna of the wireless power supply module, so that energy supplied by power supply counterpart equipment arranged outside the bearing is wirelessly obtainable.

8. The sensing device according to claim 1, wherein the RFID chip includes a power management circuit of the wireless power supply module.

9. The sensing device according to claim 1, further comprising a channel for accommodating electrical conductors arranged inside the base.

10. The sensing device according to claim 1, wherein the base comprises an auxiliary connection structure configured for connection with a bearing member of the bearing.

11. The sensing device according to claim 1, wherein the base is made of a same material as the bearing member on which the sensing device is mounted.

12. The sensing device according to claim 1, wherein the sensing device is at least partially encapsulated.

13. A bearing component, comprising a bearing and the sensing device according to claim 1.

14. The bearing component according to claim 13, wherein the sensing device is mounted in a mounting hole of an outer ring or an inner ring of the bearing, and the mounting hole extends along an axial direction of the bearing; or, the sensing device is mounted in a mounting hole of a rolling element of the bearing, and the mounting hole extends along a central axis of the rolling element.

15. A sensing system for a bearing, the sensing system comprising the sensing device according to claim 1 and sensing device counterpart equipment arranged outside the bearing.

16. A bearing assembly, comprising a bearing and the sensing system according to claim 15.

* * * * *